F. G. HIRST.
GREASE CUP.
APPLICATION FILED MAY 2, 1919.
1,318,668.
Patented Oct. 14, 1919.
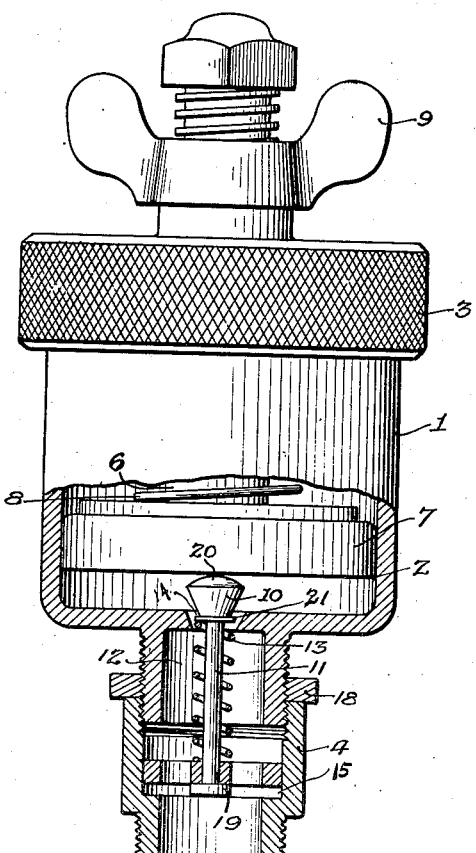
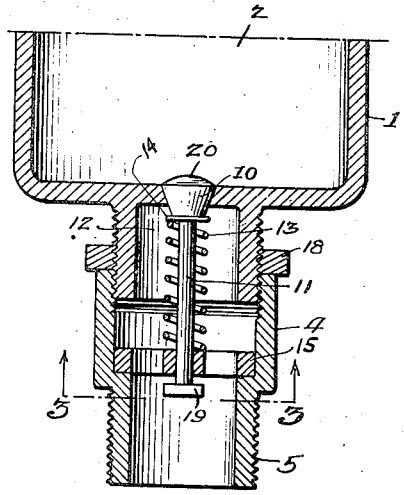
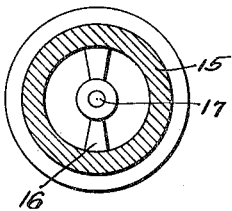
Inventor:
Franklin G. Hirst.
by Mahlon van Bostwick
his Attorney

UNITED STATES PATENT OFFICE.

FRANKLIN G. HIRST, OF PHILADELPHIA, PENNSYLVANIA.

GREASE-CUP.

1,318,668.  Specification of Letters Patent.  Patented Oct. 14, 1919.

Original application filed December 14, 1918, Serial No. 266,699. Divided and this application filed May 2, 1919. Serial No. 294,174.

*To all whom it may concern:*

Be it known that FRANKLIN G. HIRST, a citizen of the United States, residing at Philadelphia, in the county of Philadelphia and State of Pennsylvania, has invented certain new and useful Improvements in Grease-Cups, of which the following is a specification.

My invention relates to grease cups or lubricators from which the lubricant is ejected by means of pressure applied thereto, the pressure gradually lessening as the volume of lubricant diminishes, and the delivery passage being controlled by a valve movable with the pressure device so as to gradually increase the area of such passage as the pressure upon the lubricant diminishes, and is a division of my application filed December 14th, 1919, Serial No. 266,699.

The objects of the present invention are to provide a grease cup of the class described, the outlet of which is controlled by a vertically moving valve operable in the nozzle structure of said cup, the closing movement thereof being regulated by the pressure of the grease which acts upon by the plunger and compression means connected with said valve to cause a reverse movement thereof as the pressure of the plunger diminishes.

These and other objects I attain in the manner hereinafter set forth, reference being had to the accompanying drawings, in which:—

Figure 1 is a vertical sectional view of a lubricator constructed in accordance with my invention, the vertically moving valve being shown in an open position;

Fig. 2 is a like vertical sectional view with the vertically moving valve shown in a closed position, and Fig. 3 is a top or plan view of the hollow washer used in the nozzle outlet of the lubricator taken on line 3—3 of Fig. 2.

Like parts are referred to by like reference characters throughout the drawings.

Referring to the drawings in detail the numeral 1 designates the body or cup of the lubricator, the interior portion 2 thereof comprising a receptacle for the lubricant, closed at the top by a cap or cover 3, and has at the bottom the nozzle structure 4 in which is formed the valve controlled outlet passage 5 of the cup.

The said cup 3 is provided with the usual threaded plunger stem 6 of a plunger 7 which fits snugly to the inner wall of the cup 1 and is acted upon by a coiled spring 8 disposed between the underside of the cover 3 and the plunger 7 and tending to constantly depress said plunger. The threaded stem 6 passes freely through an opening in the cover 3 and is provided above said cover with a winged nut 9. By means of this winged nut 9 the plunger 7 is drawn to its uppermost position in the cup.

A vertically moving valve 10, conical in form, having the valve stem 11, is adapted for movement in the vertical opening 12 in the nozzle structure 4 as shown. A spiral spring 13 is positioned around the valve stem 11 and is disposed between the shoulder 14 of the valve 10 and the head of the hollow washer 15. Said hollow washer 15, positioned in the outlet, movable with the valve 10, normally rests on the shoulders provided in the nozzle structure 4 as illustrated in Figs. 1 and 2 and has a web or brace 16, through which the valve stem 11 passes by means of the aperture 17 therein. The said hollow washer 15 is particularly illustrated in Fig. 3.

A lock nut 18 is provided in the nozzle structure 4, as illustrated, and a member 19 is provided on the valve stem 11 near its terminus to limit the upward travel thereof. The valve 10, is, as beforesaid, conical in form and turbinate or top shaped by reason of the cap 20 thereon. This cap provides for an absolutely sealed outlet, as illustrated in Fig. 2, when the plunger is in its uppermost position and prevents seepage of the lubricant before adjustment of the pressure means.

In operation: When the plunger 7 is released from its uppermost position the greatest pressure is exerted. As the lubricant under this plunger pressure forces the valve downwardly, diminishing the area of the outlet 21, said lubricant enters the opening 12 in the nozzle structure 4 through said outlet 21 and is discharged through the hollow washer 15 and the nozzle outlet 5. As the pressure of the plunger spring 8 lessens and thereby diminishes the flow of the lubricant the pressure of the spring 13 gains force so that when the pressure of the spring 13 is greater than that of the plunger spring 8 the valve gradually reverses its movement gradually increasing the area of the outlet 21 until the plunger has completed its stroke and the contents of the cup have been discharged.

It will be obvious that to secure this result the operator before putting the lubricator in use will adjust the tension of the spring 13 by compressing the same between the shoulder 14 and the washer 15 to the required pressure, a portion of the nozzle structure being threaded as illustrated for such purpose. This tension is then retained by means of the lock nut 18.

The greatest force of the plunger is exerted at, substantially, the first quarter part of its stroke and unless this initial pressure is throttled an excess discharge of lubricant follows, therefore the pressure of the spring 13 should be so regulated as to provide the smallest area of outlet for the lubricant when the plunger is in its upper position.

Being thus regulated the lubricant will flow through the outlet 21 and passage 12 and the hollow washer 15 and nozzle outlet 5 to the bearing that is to be lubricated, until the cup is emptied.

Having thus described my invention what I claim as new and desire to secure by Letters Patent is:

1. In a grease cup provided with a spring actuated plunger and an outlet controlled by a vertically moving valve in the nozzle structure thereof, compression means in connection with said valve, opposed to the spring action of the plunger, to regulate the opening and closing movement of said valve.

2. In a grease cup provided with a spring actuated plunger and a valve controlled outlet in the nozzle structure thereof, said valve being opposed to the spring action of the plunger, means for causing vertical movement of said valve by the pressure of the lubricant as the plunger descends and compression means in connection with said valve to cause a reverse movement thereof as the plunger pressure diminishes.

3. In a grease cup provided with a spring actuated plunger, a nozzle structure and an outlet, a vertical opening in said nozzle structure, a vertically moving valve, opposed to the spring action of the plunger, adapted for movement in said opening whereby as said plunger descends the lubricant will force said valve downwardly thereby gradually closing the outlet of said cup and compression means connected with said valve whereby closing movement thereof is effected as the plunger pressure diminishes.

4. In a grease cup provided with a spring actuated plunger, a nozzle structure and an outlet, a vertical opening in said nozzle structure, a vertically moving valve, adapted for movement in said opening, a valve stem, a spiral spring positioned around said stem, opposed to the spring action of the plunger, means for retaining said spring in position, a hollow washer, positioned in the outlet of said cup the valve stem passing therethrough and means to regulate the compression of said spring, providing means to insure a uniform discharge of the lubricant from the cup.

5. In a grease cup provided with a spring actuated plunger, a nozzle structure and an outlet, a vertical opening in said nozzle structure, a vertically moving valve, adapted for movement in said opening, a valve stem, a spiral spring positioned around said stem, opposed to the spring action of the plunger, means for retaining said spring in position, a hollow washer positioned in the outlet of said cup the valve stem passing therethrough and means to regulate the compression of said spring, said valve being conical in form and turbinate or top shaped by reason of a cap thereon whereby the outlet of said cup is sealed when the plunger is in its uppermost position.

In testimony whereof I affix my signature.

FRANKLIN G. HIRST.